United States Patent
Amirault et al.

(10) Patent No.: US 9,233,630 B2
(45) Date of Patent: Jan. 12, 2016

(54) BELT-POSITIONING BOOSTER SEAT FOR VEHICLES

(71) Applicant: Cosco Management, Inc., Wilmington, DE (US)

(72) Inventors: David M Amirault, Indianapolis, IN (US); Kelley L Clayburn, Hope, IN (US); Meihui Lin, Nashville, IN (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 101 days.

(21) Appl. No.: 14/198,137

(22) Filed: Mar. 5, 2014

(65) Prior Publication Data
US 2014/0252825 A1    Sep. 11, 2014

Related U.S. Application Data

(60) Provisional application No. 61/772,941, filed on Mar. 5, 2013, provisional application No. 61/889,989, filed on Oct. 11, 2013.

(51) Int. Cl.
*A47C 1/08* (2006.01)
*B60N 2/28* (2006.01)
*B60R 22/26* (2006.01)

(52) U.S. Cl.
CPC ............ *B60N 2/2866* (2013.01); *B60N 2/2806* (2013.01); *B60R 22/26* (2013.01)

(58) Field of Classification Search
CPC ...................................................... B60R 22/26
USPC ................ 297/250.1, 483, 256.16, 253, 485
See application file for complete search history.

(56) References Cited

U.S. PATENT DOCUMENTS

| | | | |
|---|---|---|---|
| 4,836,605 A | 6/1989 | Greenwood et al. | |
| 5,499,860 A * | 3/1996 | Smith et al. | 297/255 |
| 5,868,463 A * | 2/1999 | MacKenzie et al. | 297/228.12 |
| 5,868,465 A * | 2/1999 | Kvalvik | A47D 15/006 |
| | | | 297/228.1 |
| 6,082,819 A * | 7/2000 | Jackson | B60N 2/2821 |
| | | | 297/250.1 |
| D461,646 S | 8/2002 | Kain | |
| 6,832,813 B2 | 12/2004 | Tomas et al. | |
| 6,935,685 B2 | 8/2005 | Kassai et al. | |
| 7,222,917 B2 | 5/2007 | Ward | |
| 7,331,633 B2 | 2/2008 | Balensiefer et al. | |
| 7,708,342 B2 | 5/2010 | Leach | |
| 7,770,969 B2 * | 8/2010 | Boyle et al. | 297/254 |
| 8,132,863 B2 * | 3/2012 | Surgeon et al. | 297/473 |
| 8,833,854 B2 * | 9/2014 | Lu | A47D 1/103 |
| | | | 297/253 |
| 9,033,420 B2 * | 5/2015 | Lievestro et al. | 297/452.48 |
| 2002/0017808 A1 | 2/2002 | Kain | |
| 2002/0038968 A1 * | 4/2002 | Maier | B60N 2/2821 |
| | | | 297/253 |
| 2003/0102702 A1 | 6/2003 | Daley et al. | |
| 2004/0178668 A1 | 9/2004 | Kassai et al. | |
| 2004/0239166 A1 | 12/2004 | Kihlberg et al. | |
| 2007/0046084 A1 * | 3/2007 | Leach | 297/250.1 |
| 2007/0096519 A1 * | 5/2007 | Conforti | 297/218.2 |
| 2007/0152479 A1 * | 7/2007 | Howman et al. | 297/180.11 |
| 2008/0135593 A1 | 6/2008 | Munther | |
| 2008/0258524 A1 | 10/2008 | Zink et al. | |
| 2011/0291450 A1 * | 12/2011 | Gillett et al. | 297/250.1 |
| 2012/0019033 A1 | 1/2012 | Kelly | |

* cited by examiner

*Primary Examiner* — Syed A Islam
(74) *Attorney, Agent, or Firm* — Barnes & Thornburg LLP

(57) ABSTRACT

A belt-positioning booster seat is adapted to be positioned on a passenger seat included in a vehicle and to support a child seated on the passenger seat. The belt-positioning booster seat includes a seat pad to elevate a child above a seat bottom of the passenger seat along with left and right belt guides adapted to receive a lap belt that extends over a child seated on the seat pad.

24 Claims, 11 Drawing Sheets

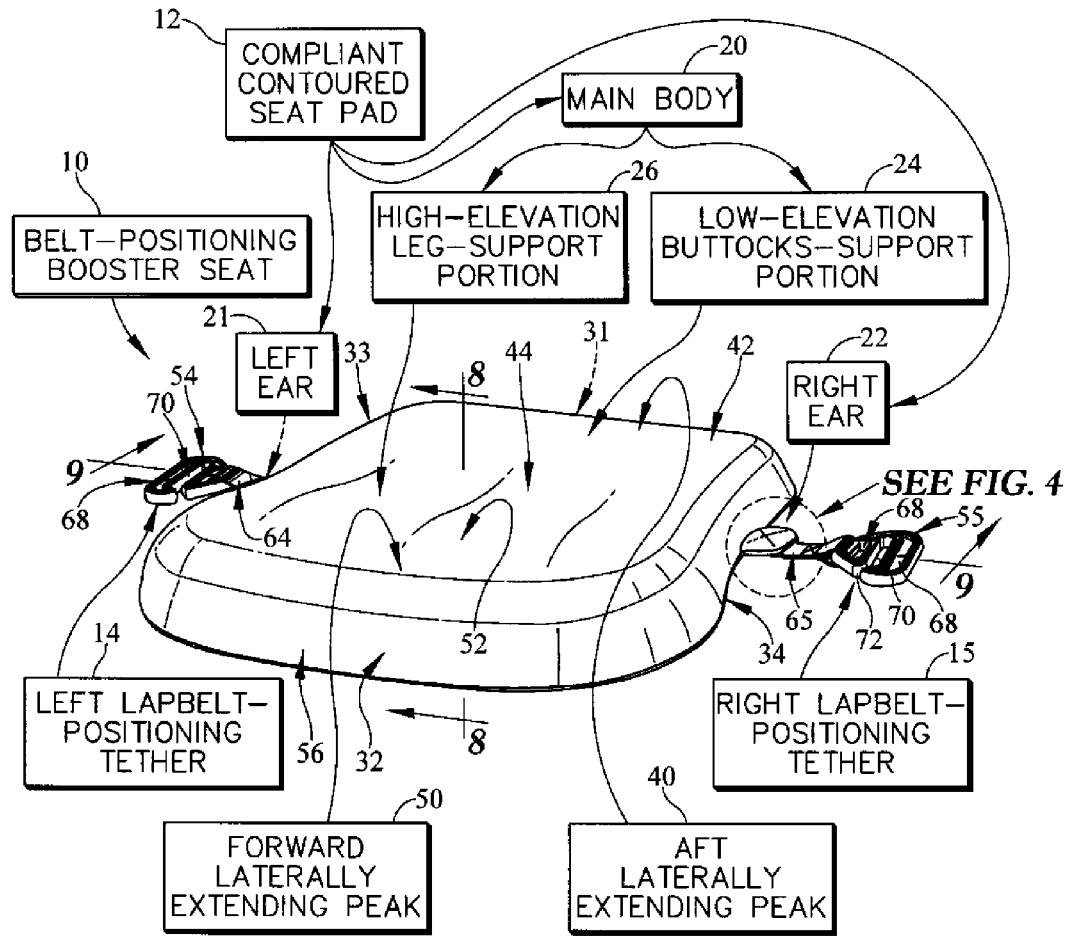

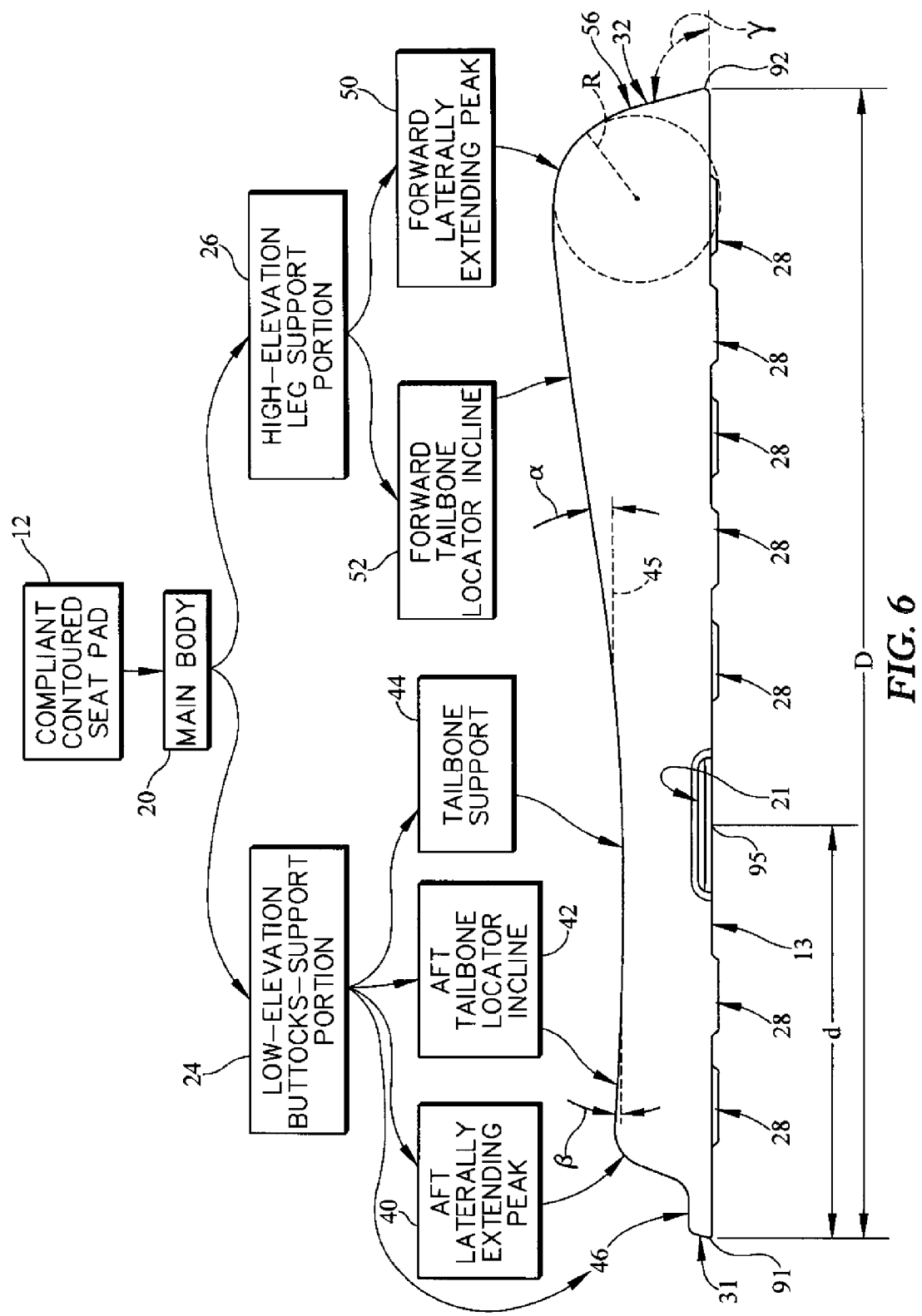

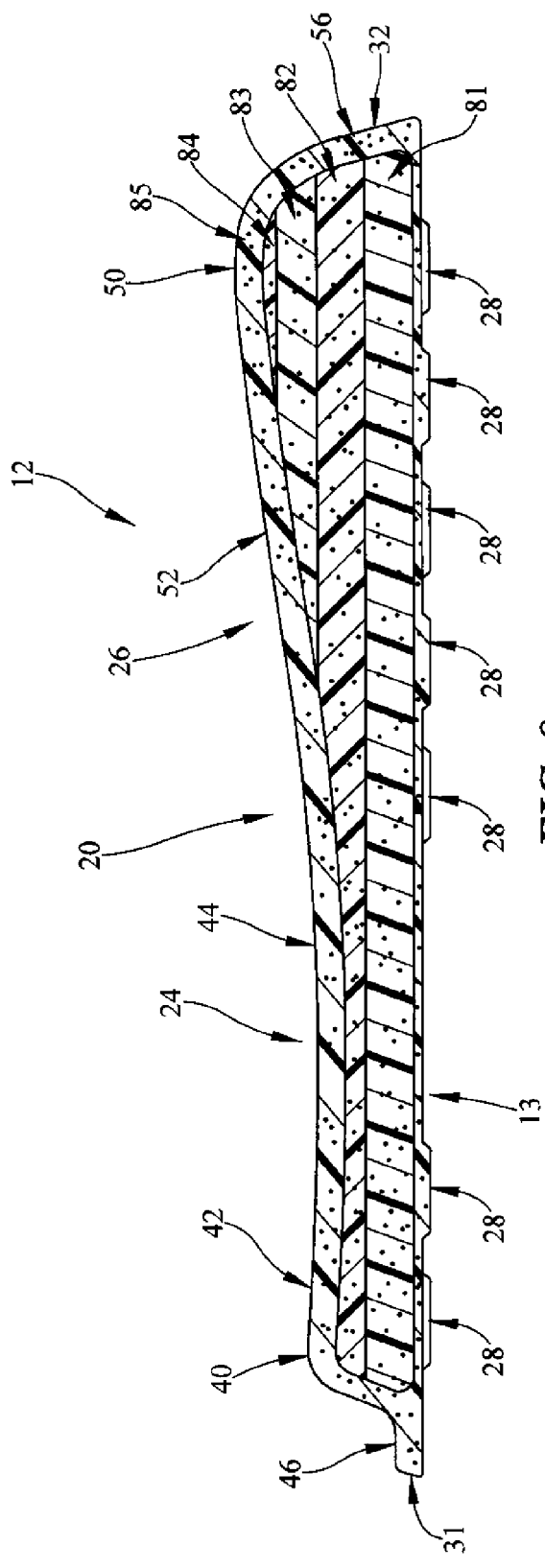
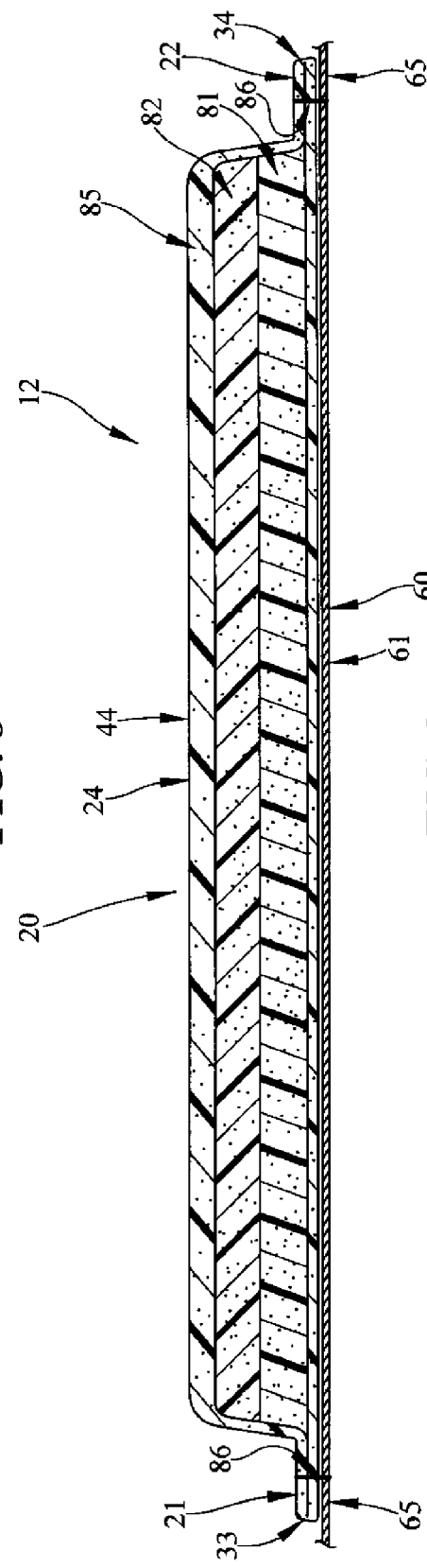
FIG. 8
FIG. 9

BELT-POSITIONING BOOSTER SEAT FOR VEHICLES

PRIORITY CLAIM

This application claims priority under 35 U.S.C. §119(e) to U.S. Provisional Application Ser. No. 61/772,941, filed Mar. 5, 2013, and to U.S. Provisional Application Ser. No. 61/889,989, filed Oct. 11, 2013, which are expressly incorporated by reference herein.

BACKGROUND

The present disclosure relates to child passenger seats, and particularly to a system for retaining a child passenger seat in place on a passenger seat in a vehicle. More particularly, the present disclosure relates to a system for positioning a seat belt provided alongside a passenger seat in a vehicle relative to a child seated on a child passenger seat placed on the passenger seat.

SUMMARY

According to the present disclosure, a belt-positioning booster seat is adapted for use with a passenger seat in a vehicle having a seat bottom and a seat back. The belt-positioning booster seat includes a seat pad along with left and right lap belt-positioning tethers that extend from the seat pad. The seat pad elevates the child above the seat bottom of the passenger seat. The left and right lap belt-positioning tethers receive and guide a lap belt across a child seated on the belt-positioning booster seat.

In illustrative embodiments, the shape of the seat pad is contoured in accordance with the present disclosure to position the tailbone of a child seated on the seat pad in a predetermined location in close proximity to a rear edge of the seat pad next to the seat back of an underlying passenger seat. The seat pad includes a low-elevation tailbone support, an aft tailbone-locator incline arranged to extend upwardly in a rearward direction from the tailbone support toward the seat back, and a forward tailbone locator incline arranged to extend upwardly from the low-elevation tailbone support in a forward direction away from the seat back. The low-elevation tailbone support is shaped and arranged to locate the tailbone of the seat occupant at a certain distance from the rear edge of the seat pad.

In illustrative embodiments, the seat pad includes a body, a left ear that extends outwardly from a left side of the body, and a right ear that extends outwardly from a right side of the body. The body of the seat pad is formed to include the low-elevation tailbone support, the aft tailbone-locator incline, and the forward tailbone-locator incline. The left and right ears are thinner than the body of the seat pad. The reduced thickness of the left and right ears allows stitches of thread to extend through left and right ears and through the left and right lap belt-positioning tethers to secure the left and right lap belt-positioning tethers to the left and right ears.

In illustrative embodiments, the seat pad is constructed from compliant foam materials so that the seat pad yields elastically when a child sits on the seat pad. The seat pad illustratively includes a plurality of shaped foam layers received in a foam cover that cooperate to provide the body of the seat pad. The cover illustratively extends away from the body of the seat pad without receiving any shaped foam layers to provide the left and right ears that are secured to the left and right lap belt-positioning tethers by stitches of thread.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective view of a belt-positioning booster seat in accordance with the present disclosure at rest on a seat bottom of a passenger seat in a vehicle supporting a child showing that the booster seat includes a compliant contoured seat pad adapted to elevate the child above the seat bottom of the passenger seat, a left lap belt-positioning tether coupled to the compliant contoured seat pad, and a right lap belt-positioning tether coupled to the compliant contoured seat pad and showing the first and the second lap belt-positioning tethers receiving and guiding a lap belt across thighs of a child seated on the compliant contoured seat pad;

FIG. 2 is a cross-sectional view of the belt-positioning booster seat of FIG. 1 showing that the compliant contoured seat pad is made from compliant foam materials and is shaped to locate a child's tailbone on the compliant contoured seat pad at a predetermined distance from a rear edge of the compliant contoured seat pad and to guide the thighs and the lower legs of the child to form a slightly obtuse knee angle between the thighs and lower legs so that the child's legs transition smoothly toward the front of the seat bottom included in the passenger seat;

FIG. 3 is a perspective view of the compliant contoured seat pad, the left lap belt-positioning tether, and the right lap belt-positioning tether included in the belt-positioning booster seat of FIGS. 1 and 2 showing that the compliant contoured seat pad includes a body having a low-elevation buttocks-support portion and a high-elevation leg-support portion, a left ear that is secured to the left lap belt-positioning tether, and a right ear that extends from the body that is secured to the right lap belt-positioning tether;

FIG. 4 is a detailed view of a portion of the belt-positioning booster seat of FIG. 3 showing that the right ear of the compliant contoured seat pad is thinner than the body of the compliant contoured seat pad and showing that the right ear is secured to the right lap belt-positioning tether by a series of stitches;

FIG. 5 is a cross-sectional view taken along line 5-5 shown in FIG. 4 showing that the stitches securing the right ear to the right lap belt-positioning tether extend through the right ear and the right lap belt-positioning tether;

Figure 1:
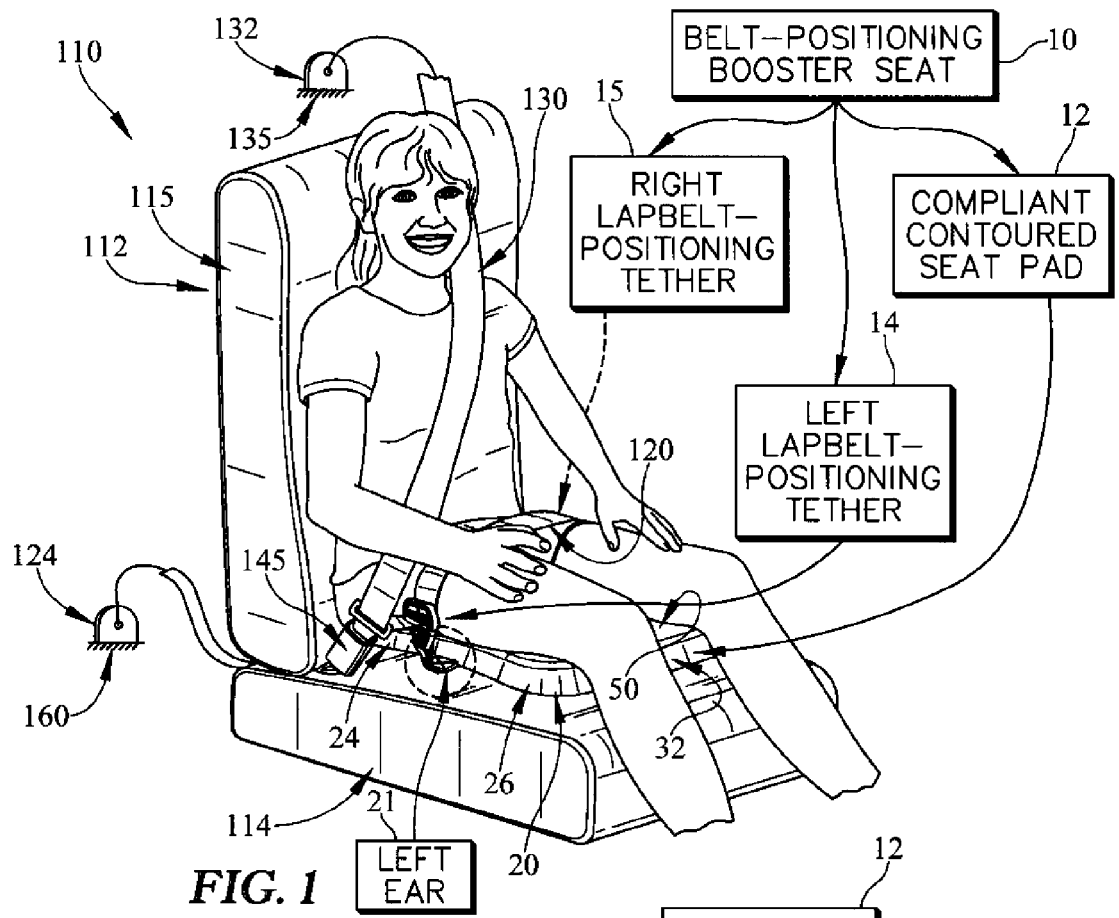
Figure 7:
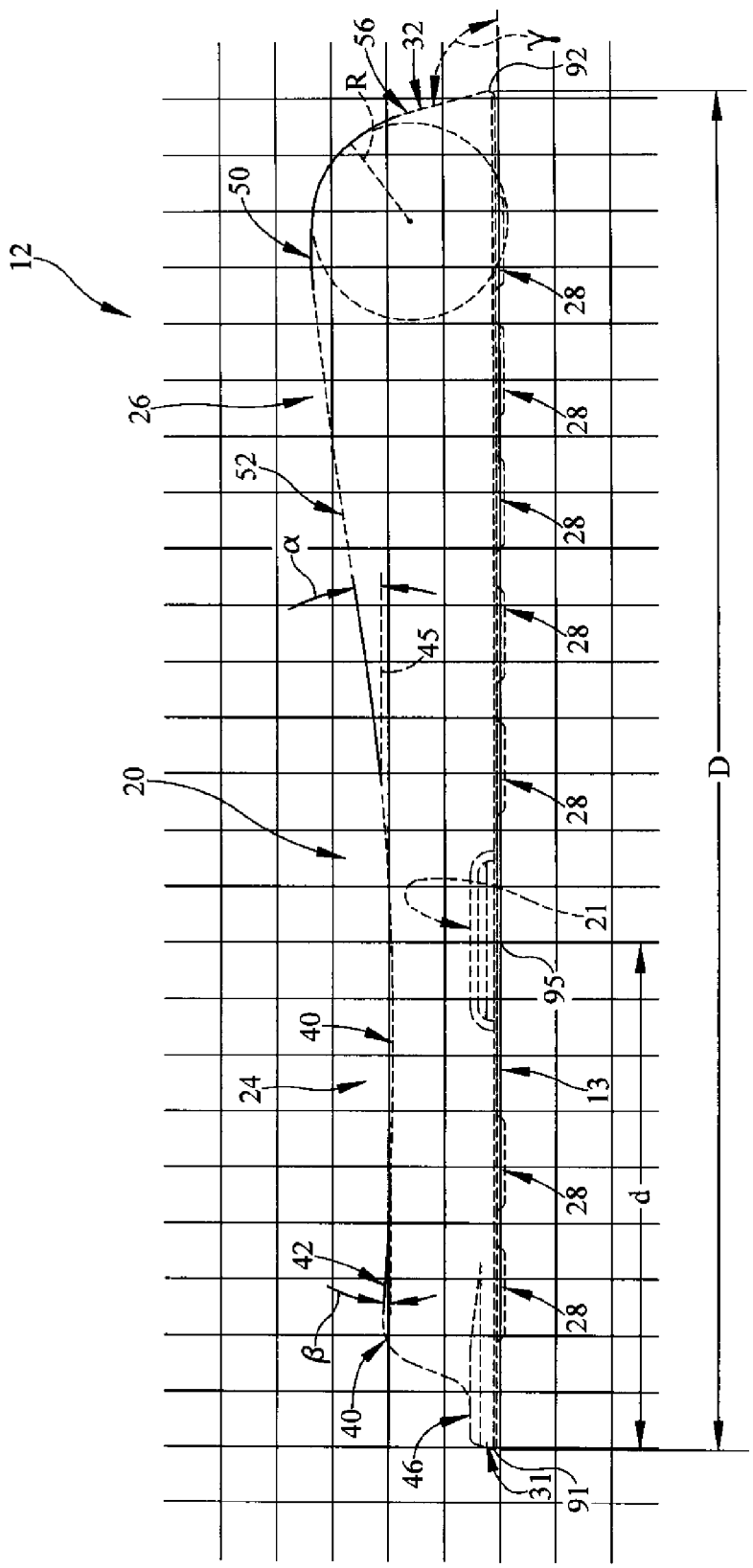
Figure 10:
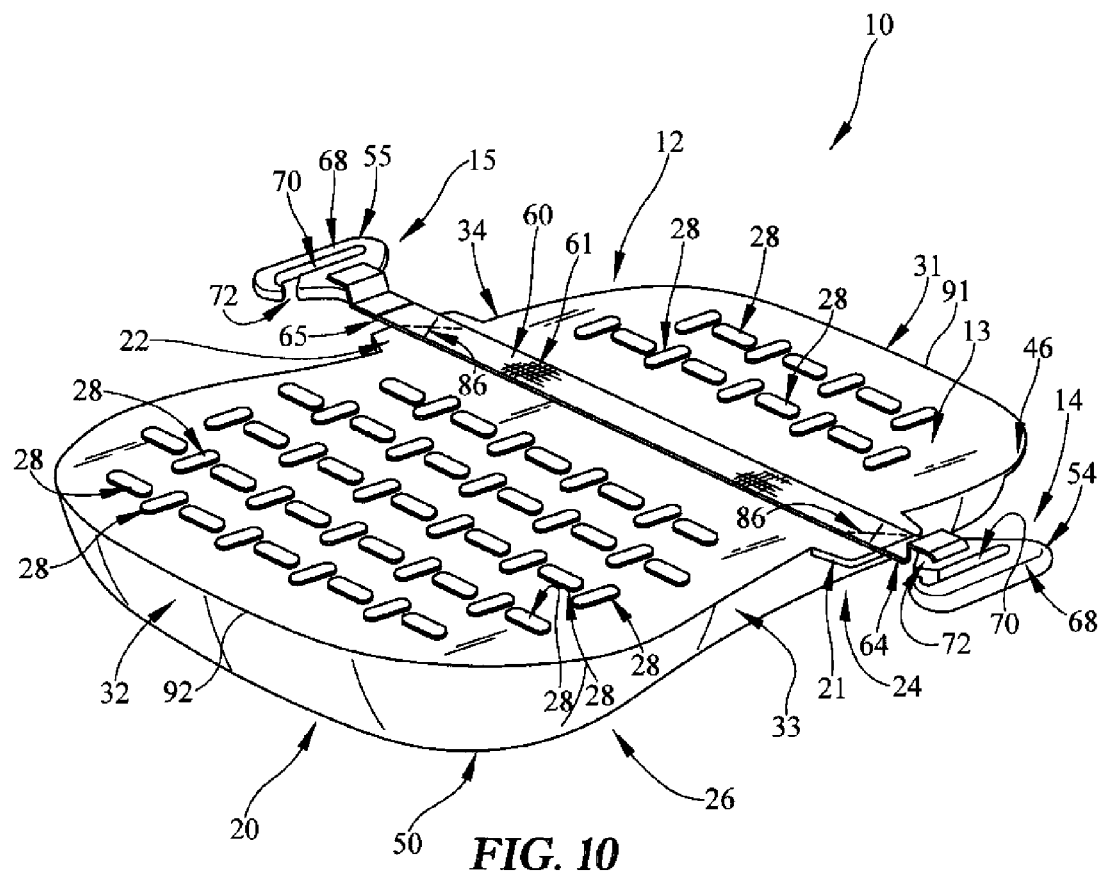
Figure 11:
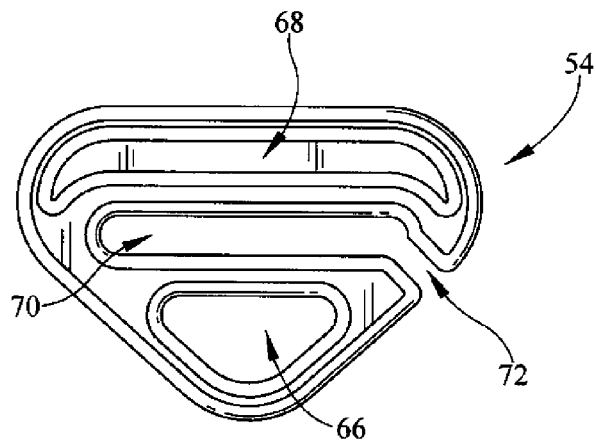
Figure 12:
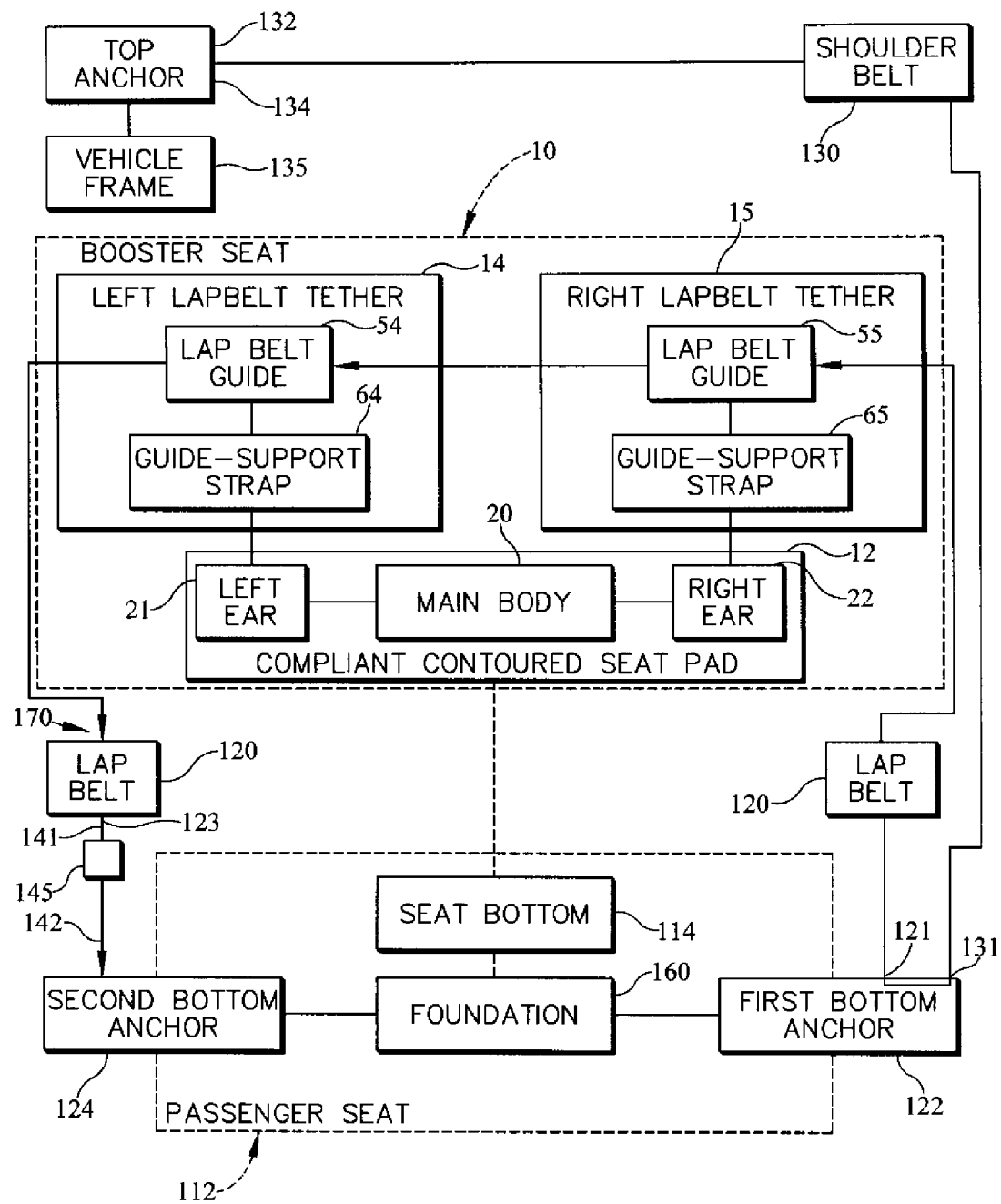
Figure 13:
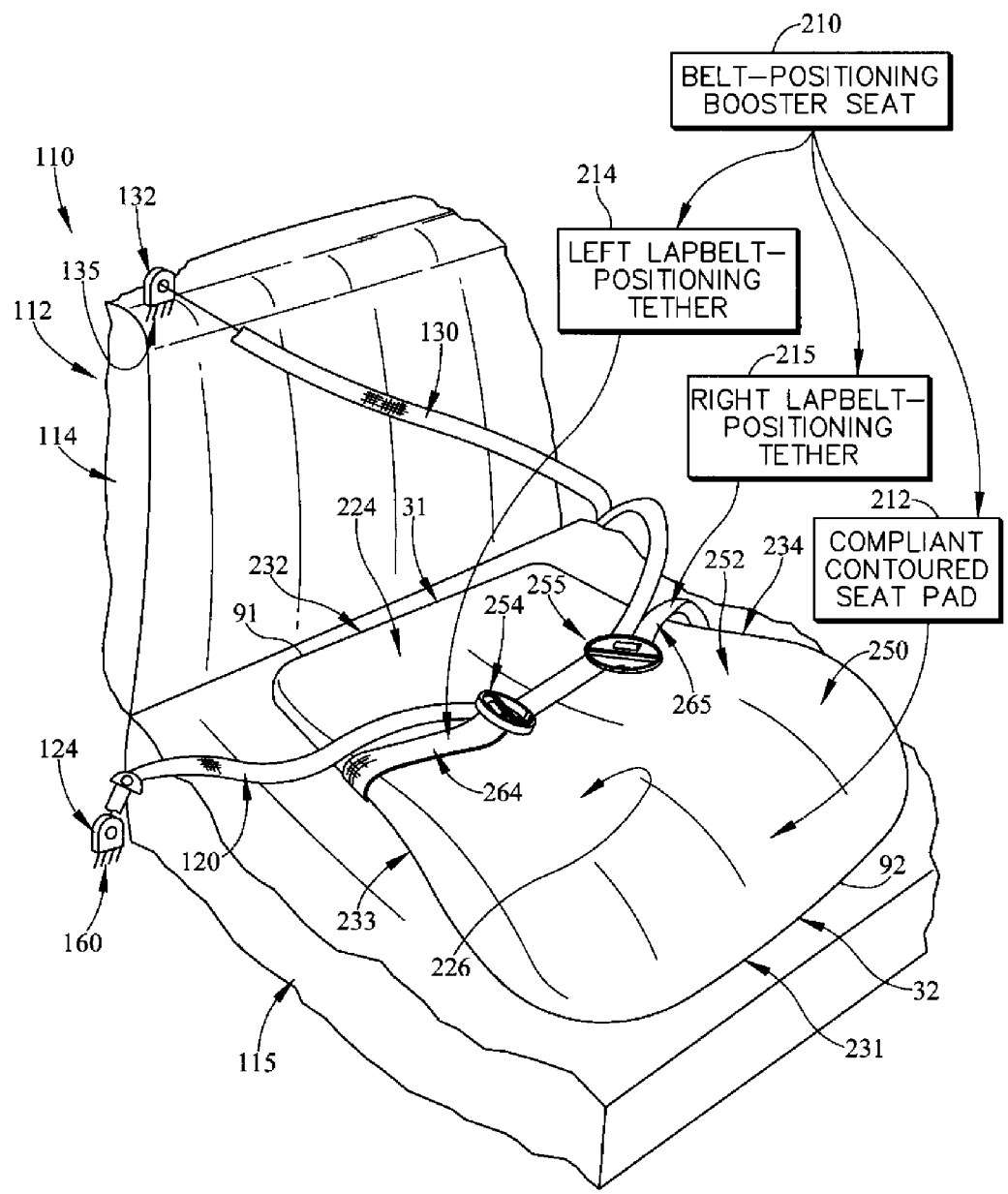
Figure 14:
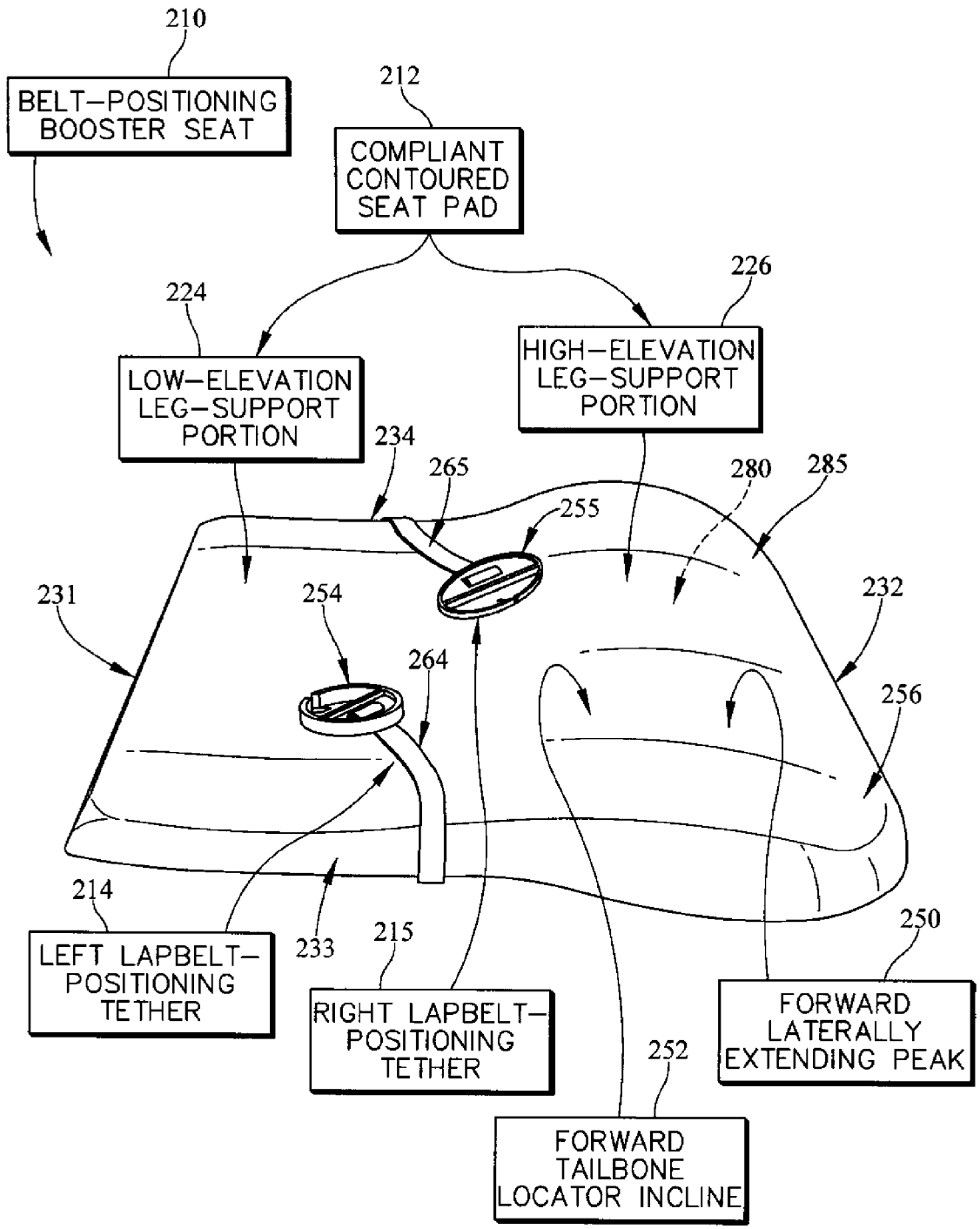
Figure 15:
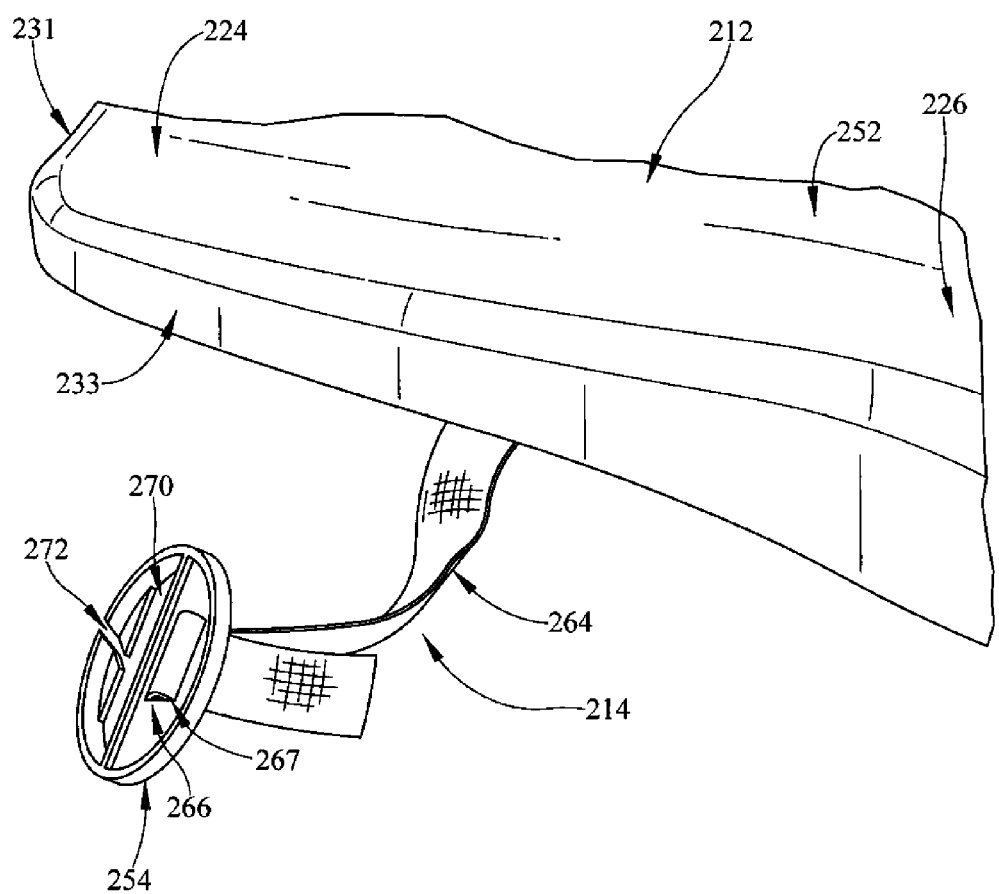
Figure 16:
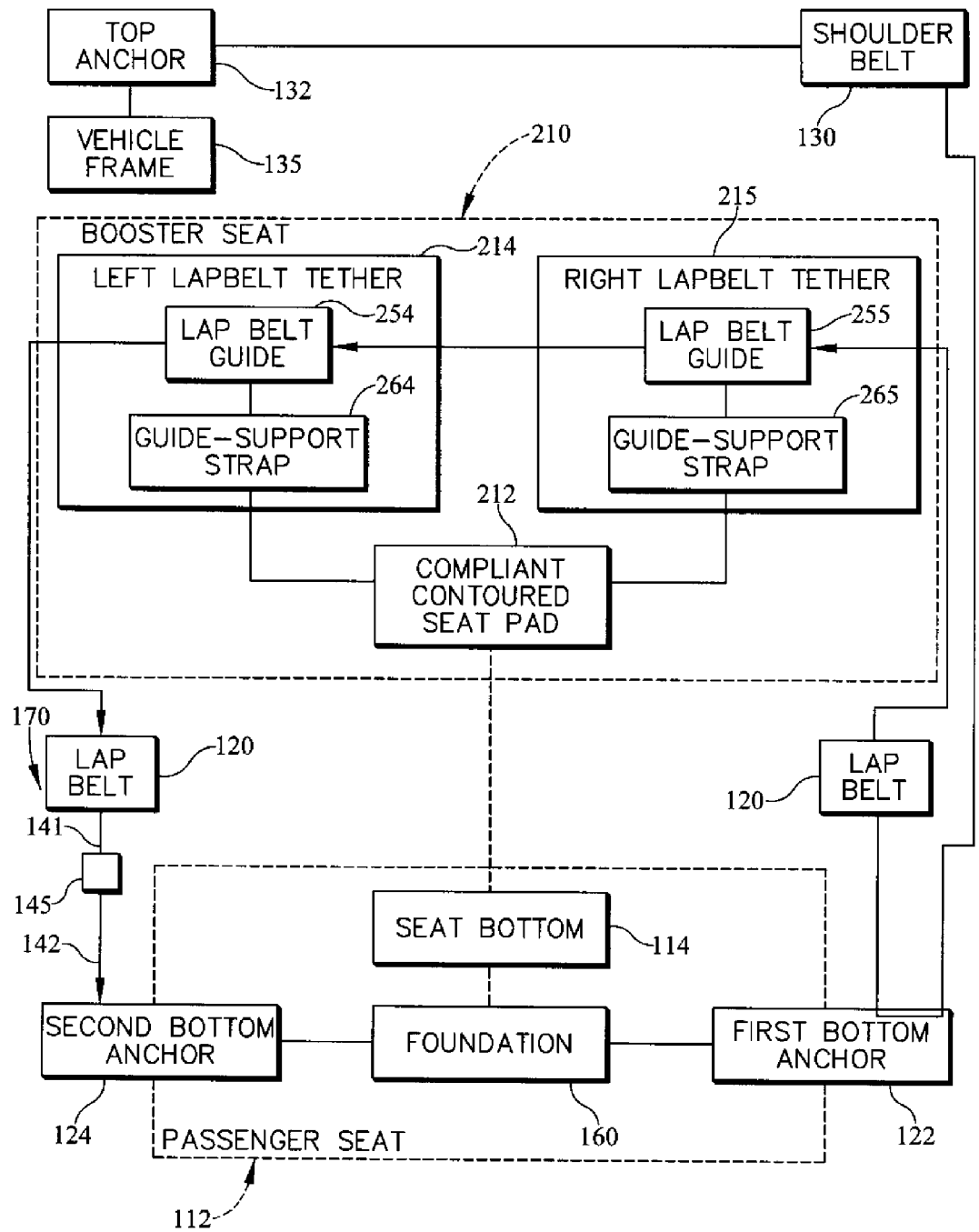

FIG. 6 is a side elevation view of the compliant contoured seat pad showing that the low-elevation buttocks-support portion includes an aft laterally extending peak, a tailbone support adapted to underlie a child's tailbone and arranged at a preselected location between a front and a back of the compliant contoured seat pad, and an aft tailbone-locator incline sloping between the aft laterally extending peak and the tailbone support to encourage location of a child's tailbone on the tailbone support of the low-elevation buttocks-support portion and showing that the high-elevation buttocks-support portion includes a forward laterally extending peak and a forward tailbone-locator incline sloping between the forward laterally extending peak and the tailbone support to encourage location of a child's tailbone on the tailbone support of the low-elevation buttocks-support portion;

FIG. 7 is a view similar to FIG. 6 on a grid background to illustrate the shape of the compliant contoured seat pad showing that the aft tailbone-locator incline is arranged to extend upwardly from the tailbone support toward the aft laterally extending peak forming a first angle β between the tailbone support and the aft tailbone-locator incline, showing that the forward tailbone-locator incline section is arranged to extend upwardly from the tailbone-tailbone support toward the forward laterally extending peak forming a second angle α the tailbone-tailbone support and the forward tailbone-locator incline, and further showing that the forward laterally extending peak is arranged to extend along a radius R;

FIG. 8 is a cross-sectional view of the contoured compliant seat pad included in the belt-positioning booster seat of FIG. 3 taken along line 8-8 showing that the seat pad is made from a series of shaped layers arranged inside a cover and showing that the layers are sized and arranged to define the contour of the body of the compliant contoured seat pad;

FIG. 9 is a cross-sectional view of the belt-positioning booster seat of FIG. 3 taken along line 9-9 showing that neither the right ear nor the left ear of the contoured seat pad receive any shaped layers as are received in the body of the compliant contoured seat pad;

FIG. 10 is a bottom perspective view of the belt-positioning booster seat of FIGS. 1 and 3 showing that each of the first and second lap belt-positioning tethers include a corresponding portion of a single lap belt strap and a corresponding lap belt guide configured to receive a lap belt and showing that the lap belt strap extends along the underside of the contoured compliant seat pad to provide a handle for a caregiver transporting the belt-positioning booster seat;

FIG. 11 is a top plan view of one of the lap belt guides showing that the lap belt guide is a monolithic component formed to include an aperture sized to receive the lap belt strap, a grip sized to be held by a child hand, and a belt-receiver slot arranged between the aperture and the grip and showing that the belt-receiver slot is accessible through a diagonal belt-travel slot communicating with the belt-receiver slot to allow a child to slide a lap belt into the belt-receiver slot;

FIG. 12 is a diagrammatic view of the belt-positioning booster seat of FIG. 1 in combination with a passenger seat and a passenger restraint harness system including a lap and shoulder belt and various top and bottom belt anchors associated with the passenger seat;

FIG. 13 is a perspective view of another belt-positioning booster seat in accordance with the present disclosure at rest on a seat bottom of a passenger seat in a vehicle showing that the booster seat includes a compliant contoured seat pad adapted to elevate a child supported on the belt-positioning booster seat above the seat bottom of the passenger seat, a left lap belt-positioning tether coupled to the compliant contoured seat pad, and a right lap belt-positioning tether coupled to the compliant contoured seat pad and showing the first and the second lap belt-positioning tethers receiving and guiding a lap belt across the compliant contoured seat pad;

FIG. 14 is a top perspective view of the belt-positioning booster seat of FIG. 13 showing that the compliant contoured seat pad includes a low-elevation buttocks-support portion and a high-elevation leg-support portion and showing that the high-elevation leg-support portion comprises a laterally extending peak and a forward tailbone-locator incline sloping between the low-elevation buttocks-support portion and the forward laterally extending peak to encourage location of a child's tailbone on the low-elevation buttocks-support portion of the compliant contoured seat pad;

FIG. 15 is an enlarged view of one of the belt-positioning tethers of FIGS. 13 and 14 showing that the belt-positioning tether includes a lap belt guide formed to include a belt-receiver slot and a diagonal belt-travel slot communicating with the belt-receiver slot and a lap belt strap coupled at one end to a first side of the seat pad and at an opposite end to the lap belt guide in a manner that allows a caregiver to vary an effective length of the guide-support strap; and FIG. 16 is a diagrammatic view of the belt-positioning booster seat of FIG. 13 in combination with a passenger seat and a passenger restraint harness system including a lap and shoulder belt and various top and bottom belt anchors associated with the passenger seat.

DETAILED DESCRIPTION

Figure 2:
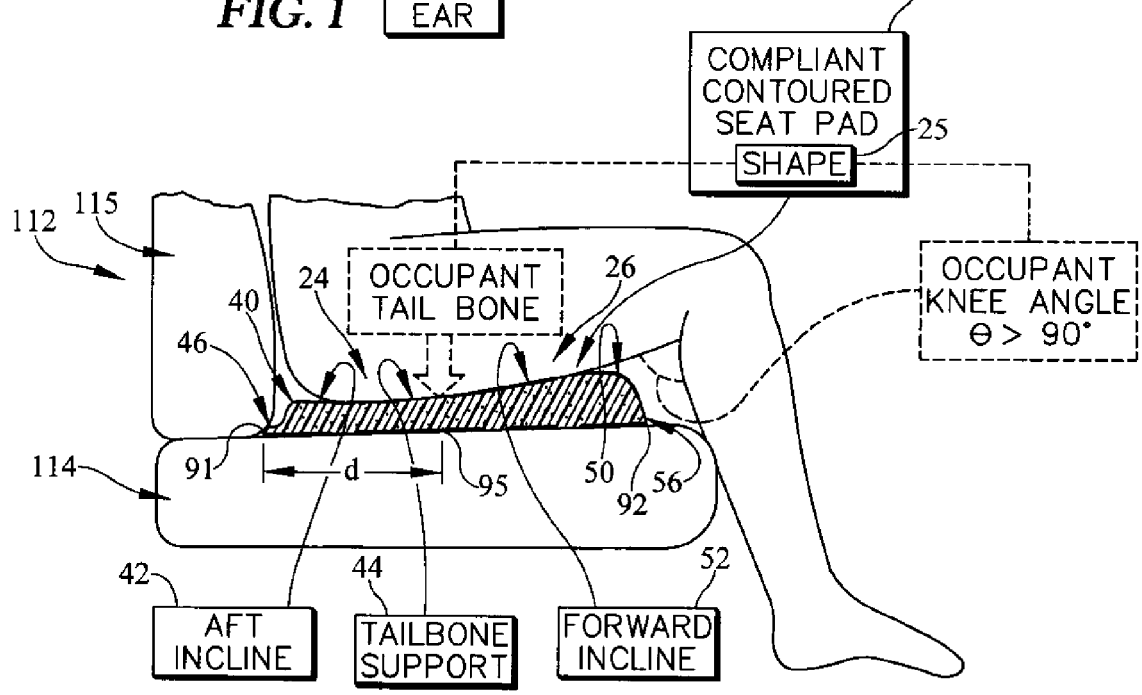

An illustrative belt-positioning booster seat 10 in accordance with the present disclosure is adapted to be arranged on a seat bottom 114 of a passenger seat 112 along a seat back 115 of passenger seat 112 in a vehicle 110 to support a child in the vehicle 110 as shown in FIG. 1. Belt-positioning booster seat 10 includes a compliant contoured seat pad 12, a left lap belt-positioning tether 14, and a right lap belt-positioning tether 15. Compliant contoured seat pad 12 has a preselected shape 25 configured to provide means for positioning a child's tailbone and legs relative to passenger seat 113 so that the child is encouraged to sit up straight and to have a slightly obtuse knee angle as shown in FIG. 2. Belt-positioning tethers 14, 15 receive and guide a lap belt 120 across the thighs of a child seated on compliant contoured seat pad 12 so that the lap belt 120 is maintained in spaced apart relation to the midsection of the child without requiring an armrest or hard guide.

Compliant contoured seat pad 12 is adapted to elevate the child above seat bottom 114 of passenger seat 112 and is formed to include a body 20, a left ear 21, and a right ear 22 as shown, for example, in FIG. 3. Body 20 of compliant contoured seat pad 12 is adapted to position the child on passenger seat 112. Body 20 illustratively includes an aft tailbone-locator incline 42 that slopes downwardly from behind a tailbone support 44 of body 20 to locate the tailbone of a child over tailbone support 44. Body 20 also includes a forward tailbone-locator incline 52 that slopes downwardly from in front of tailbone support 44 to locate the tailbone of a child over tailbone support 44.

Left and right ears 21, 22 of compliant contoured seat pad 12 are secured to left and right lap belt-positioning tethers 14, 15, respectively, by stitches of thread 86 so that lap belt-positioning tethers 14, 15 are coupled to compliant contoured seat pad 12 as shown in FIGS. 3-5. The left and right ears 21, 22 have a reduced thickness when compared body 20 so that stitches of thread 86 can extend through left and right ears 21, 22 along with left and right lap belt-positioning tethers 14, 15.

Compliant contoured seat pad 12 is illustratively constructed from foam materials without hardened supports so that compliant contoured seat pad 12 yields elastically when a child sits on belt-positioning booster seat 10 as suggested in FIG. 1. In the illustrative embodiment, compliant contoured seat pad 12 includes a plurality of shaped layers 81, 82, 83, 84 made of foam received in a cover 85 made from foam that cooperate to provide body 20 of compliant contoured seat pad 12. Cover 85 extends away from body 20 without receiving any shaped layers to provide left and right ears 21, 22 of compliant contoured seat pad 12.

Body 20 of compliant contoured seat pad 12 is adapted to underlie a child supported on belt-positioning booster seat 10 and illustratively includes a low-elevation buttocks-support portion 24 and a high-elevation leg-support portion 26 as shown in FIG. 3. Low-elevation buttocks-support portion 24 forms a back 31 of compliant contoured seat pad 12 and is adapted to underlie the buttocks of a child seated on compliant contoured seat pad 12. High-elevation leg-support portion 26 forms a front 32 of compliant contoured seat pad 12 and is adapted to support the legs of a child seated on compliant contoured seat pad 12 at an elevation generally greater than that of the low-elevation buttocks-support portion 24. In the illustrative embodiment, low-elevation buttocks-support portion 24 is narrower than high-elevation leg-support portion 26 between a left side 33 and a right side 34 of compliant contoured seat pad 12.

Low-elevation buttocks-support portion 24 of body 20 included in compliant contoured seat pad 12 illustratively extends about half way from back 31 of compliant contoured seat pad 12 toward front 32 of compliant contoured seat pad 12 as shown in FIGS. 6 and 7. Low-elevation buttocks-support portion 24 includes an aft laterally extending peak 40, an aft tailbone-locator incline 42 that extends forwardly from aft laterally extending peak 40, and a tailbone support 44 that extends forwardly from aft tailbone-locator incline 42. Aft laterally extending peak 40 extends between a left side 33 and a right side 34 of compliant contoured seat pad 12 along back 31 of compliant contoured seat pad 12. Aft tailbone-locator incline 42 extends downwardly from aft laterally extending peak 40 to tailbone support 44.

Aft tailbone-locator incline 42 provides a downward slope from aft laterally extending peak 40 to tailbone support 44 as shown in FIGS. 6 and 7. Aft tailbone-locator incline 42 provides means for locating the tailbone of a child forward of aft laterally extending peak 40 and over tailbone support 44 of rear low-elevation buttocks-support portion 24 when the child is seated on the belt-positioning booster seat 10 so that so that the tailbone of the child is located in a preselected position on an underlying passenger seat 112 and the child is encouraged to sit up straight. In the illustrative embodiment, aft tailbone-locator incline 42 forms an angle β of about 5.5 degrees defined between a generally flat plane 45 tangent to tailbone support 44 of low-elevation buttocks-support portion 24 and the top of aft tailbone-locator incline 42.

Tailbone support 44 is illustratively located around a location reference line 95 associated with tailbone support 44 and reference line 95 extends from the left side 33 to the right side 34 of compliant seat pad 12 as shown in FIG. 6. The reference line 95 is illustratively spaced a predetermined distance d from a rear edge 91 of compliant contoured seat pad 12 as shown in FIG. 6. The predetermined distance d is generally equivalent to the distance from seat back 115 to the tailbone of a child seated on the compliant contoured seat pad 12 and is calculated to encourage the child to sit up straight with the back of the child extending upwardly along seat back 115 rather than slouching forward or backward.

In the illustrative embodiment, distance d from rear edge 91 of compliant contoured seat pad 12 to location reference line 95 associated with tailbone support 44 may be about 18 millimeters. In the illustrative embodiment, compliant contoured seat pad 12 had a depth D from rear edge 91 to a front edge 92 of about 47 millimeters. Thus, in the illustrative embodiment the distance d is about 40 percent of the depth D of the entire compliant contoured seat pad 12 as shown in FIGS. 6 and 7.

Low-elevation buttocks-support portion 24 in the illustrative embodiment further includes a thinned heel 46 as shown in FIGS. 6 and 7. Thinned heel 46 extends rearwardly from aft laterally extending peak 40 and forms back 31 of compliant contoured seat pad 12. Thinned heel 46 is thinner from top to bottom than the rest of low-elevation buttocks-support portion 24 of body 20 included in compliant contoured seat pad 12 and is adapted to contact seat back 115 of passenger seat 112 at the intersection of seat back 115 with seat bottom 114 as shown in FIG. 2. In the illustrative embodiment, the thinned heel 46, the aft laterally extending peak 40, and the aft tailbone-locator incline 42 cooperate to extend about one-fourth of the entire depth D of the compliant contoured seat pad 12 as shown in FIGS. 6 and 7.

High-elevation leg-support portion 26 of body 20 included in compliant contoured seat pad 12 illustratively extends about half way from front 32 of compliant contoured seat pad 12 toward back 31 of compliant contoured seat pad 12 as shown in FIGS. 6 and 7. High-elevation leg-support portion 26 includes a forward laterally extending peak 50 and a forward tailbone-locator incline 52 that extends rearwardly from forward laterally extending peak 50. Forward laterally extending peak 50 extends between left side 33 and right side 34 of compliant contoured seat pad 12 along front 32 of compliant contoured seat pad 12. Forward tailbone-locator incline 52 extends downwardly from forward laterally extending peak 50 to tailbone support 44 included in low-elevation buttocks-support portion 24 of the compliant contoured seat pad 12.

Forward laterally extending peak 50 forms the top elevation of the compliant contoured seat pad 12 and extends along a curved radius R at the top elevation. In the illustrative embodiment, the curve radius of forward laterally extending peak 50 is about 37.5 millimeters at the top elevation of the compliant contoured seat pad 12. Forward laterally extending peak 50 cooperates with forward tailbone-locator incline 52 to provide means for angling the thighs of a child upward from tailbone support 44 of low-elevation buttocks-support portion 24 causing the thighs of the child to form a slightly obtuse angle θ with lower legs of the child when the child is seated on the belt-positioning booster seat 10 so that the lower legs of the child are guided along a smooth transition toward a front of seat bottom 114 included in the passenger seat 112 underlying the belt-positioning booster seat 10.

Forward tailbone-locator incline 52 slopes downwardly from forward laterally extending peak 50 to tailbone support 44 of low-elevation buttocks-support portion 24 as shown in FIGS. 6 and 7. Forward tailbone-locator incline 52 provides positioning means for locating the tailbone of a child rearward of high-elevation leg-support portion 26 over tailbone support 44 of low-elevation buttocks-support portion 24 so that the tailbone of the child is located in a preselected position on an underlying passenger seat 112 and the child is encouraged to sit up straight on passenger seat 112 as suggested in FIGS. 1 and 2. In the illustrative embodiment, forward tailbone-locator incline 52 forms an angle α of about 9.2 degrees defined between generally flat plane 45 tangent to tailbone support 44 of low-elevation buttocks-support portion 24 and the top of forward tailbone-locator incline 52.

High-elevation leg-support portion 26 in the illustrative embodiment further includes a sloped toe 56 that extends from forward laterally extending peak 50 to front 32 of compliant contoured seat pad 12 as shown in FIGS. 6 and 7. Sloped toe 56 slopes downwardly from forward laterally extending peak 50 and is shaped to form an obtuse angle γ with seat bottom 114 when compliant contoured seat pad 12 is arranged on seat bottom 114.

Body 20 of compliant contoured seat pad 12 in the illustrative embodiment further includes slip-reducer feet 28 that extend downwardly from an underside 13 of low-elevation buttocks-support portion 24 and from high-elevation leg-support portion 26 as shown in FIGS. 6, 7, and 10. Slip-reducer feet 28 engage seat bottom 114 when compliant contoured seat pad 12 is arranged on seat bottom 114 to prevent compliant contoured seat pad 12 from sliding over seat bottom 114.

Left lap belt-positioning tether 14 and right lap belt-positioning tether 15 extend outward from body 20 along corresponding left and right sides 33, 34 of compliant contoured seat pad 12 as shown in FIGS. 3, 6, and 10. Each of left lap belt-positioning tether 14 and right lap belt-positioning tether 15 include a lap belt guide 54, 55 and a portion 64, 65 of a single lap belt strap 60 as shown in FIG. 10. Lap belt guides 54, 55 are configured to receive and retain lap belt 120. Each portion 64, 65 of lap belt strap 60 included in a belt-positioning tether 14, 15 extends away from compliant contoured seat pad 12 a preselected distance. A handle portion 61 of the lap belt strap 60 extends from left side 33 to the right side 34 of compliant contoured seat pad 12 along underside 13 of compliant contoured seat pad 12 to provide a handle that can be grasped by a caregiver moving the belt-positioning booster seat 10.

Lap belt guides 54, 55 are substantially similar to one another as shown in FIG. 3. The following description of lap belt guide 54 shown in FIG. 111 is equally applicable to lap belt guide 55. Lap belt guide 54 is a monolithic component formed to include an aperture 66 sized to receive lap belt 120, a grip 68 sized to be held by a child's hand, and a belt-receiver slot 70 arranged between the aperture 66 and the grip 68. Belt-receiver slot 70 is accessible through a diagonal belt-travel slot 72 communicating with the belt-receiver slot 70 to allow a child to slide lap belt 120 into the belt-receiver slot 70.

In the illustrative embodiment, compliant contoured seat pad 12 includes a plurality of shaped layers 81, 82, 83, 84 received in a cover 85 as shown, for example, in FIGS. 8 and 9. Shaped layers 81, 82, 83, 84 and cover 85 are illustratively constructed from olefin foam without hardened reinforcements so that compliant contoured seat pad 12 has a preselected compliance and yields elastically when a child sits on the compliant contoured seat pad 12. In other embodiments, other types of foams and/or other suitable materials may be used to construct compliant contoured seat pad 12 without hardened reinforcements. In some embodiments, hardened reinforcements made from plastics or other materials may be added to compliant contoured seat pad 12.

Shaped layers 81, 82, 83, 84 are arranged within body 20 of compliant contoured seat pad 12 and are sized to define the shape of body 20 such that compliant contoured seat pad 12 provides means for positioning the child on passenger seat 112 as shown in FIG. 8. More particularly, shaped layers 81, 82, 83, 84 are shaped to form aft laterally extending peak 40, aft tailbone-locator incline 42, and tailbone support 44 of low-elevation buttocks-support portion 24 as well as forward laterally extending peak 50 and forward tailbone-locator incline 52 of high-elevation leg-support portion 26.

Cover 85 illustratively receives shaped layers 81, 82, 83, 84 to form body 20 of compliant contoured seat pad 12 and forms left and right ears 21, 22 of compliant contoured seat pad 12 as shown in FIG. 9. Cover 85 extends outwardly from tailbone support 44 of low-elevation buttocks-support portion 24 included in body 20 along left and right sides 33, 34 of compliant contoured seat pad 12 to forms left and right ears 21, 22 of compliant contoured seat pad 12. Cover 85 also forms slip-reducer feet 28.

Left and right ears 21, 22 of compliant contoured seat pad 12 formed by cover 85 do not receive any shaped layers 81, 82, 83, 84 so that left and right ears 21, 22 are thinner than body 20 as shown in FIGS. 5 and 9. On account of the thinned left and right ears 21, 22, stitches of thread 86 that extends through lap belt strap 60 and left or right ears 21, 22 is used to secure left and right lap belt-positioning tethers 14, 15 to the left and right ears 21, 22, respectively, of the compliant contoured seat pad 12 as suggested in FIG. 4. In other embodiments, adhesives and other coupling arrangements may be used to couple left and right lap belt-positioning tethers 14, 15 to the compliant contoured seat pad 12.

As suggested diagrammatically in FIG. 12, passenger seat 112 includes a first bottom anchor 122 secured to a foundation 160 in a fixed position relative to seat bottom 114 and a second bottom anchor 124 secured to a foundation 160 in a fixed position and in spaced-apart relation to first bottom anchor 122. As suggested in FIG. 1, first bottom anchor 122 is positioned to lie in a crevice 125 formed between seat bottom 114 and seat back 115. Second bottom anchor 124 is arranged to lie in the crevice 125 alongside a portion of seat bottom 114 as also suggested in FIG. 1.

As suggested in FIGS. 1 and 12, a shoulder belt 130 includes an upper end 131 coupled in a suitable manner to a top anchor 134 that is secured to a vehicle frame 135 and a lower end 132 coupled in a suitable manner to first bottom anchor 122. Lap belt 120 includes a first end 121 coupled to first bottom anchor 122 (and/or lower end of shoulder belt 130) and a second end 123 coupled to second bottom anchor 124. As suggested in FIGS. 1 and 5, a seat belt 150 including lap belt 120 and shoulder belt 130 can also include a first strap 141 coupled to first bottom anchor 122, a second strap 142 coupled to second bottom anchor 124, and a buckle unit 145 configured to releasably couple first strap 141 to second strap 142 in a customary manner.

Compliant contoured seat pad 12 is a low-profile component that blends in with seat bottom 114 of passenger seat 112. Compliant contoured seat pad 12 is shaped with contours to fit a child that is not quite tall enough to fit properly in a passenger-restraint harness system 170 while seated on a passenger seat 112. This contour (as shown, for example, in FIGS. 6 and 7) prevents slouching which might otherwise contribute to raising the lap belt from the thigh region to the abdominal region of a seated child.

Lap belt guides 54, 55 included in tethers 14, 15 cooperate to help place lap belt 120 in a proper position on the thigh region of a child seated on compliant contoured seat pad 12. The lap belt guides 54, 55 are permanently held to the compliant contoured seat pad 12 with webbing such as guide-support straps 64, 65 that are in turn secured to the compliant contoured seat pad 12 by stitches of thread 68. Belt-positioning booster seat 10 avoids reliance on armrests or inflation of inflatable features to position the lap belt on a seated child.

According to an aspect of the present disclosure, the shape 25 of the seat pad 12 is contoured to position the tailbone of a child seated on the seat pad 25 in a predetermined location in close proximity to a rear edge 91 of the seat pad 12 next to the seat back 115 of an underlying passenger seat 112 as shown in FIGS. 2, 6, and 7. The seat pad 12 includes a low-elevation tailbone support 44, an aft tailbone-locator incline 42 arranged to extend upwardly in a rearward direction from the tailbone support 44 toward the seat back 115, and a forward tailbone locator incline 52 arranged to extend upwardly from the low-elevation tailbone support 44 in a forward direction away from the seat back 115. The low-elevation tailbone support 44 is shaped and arranged to locate the tailbone of the seat 112 occupant at a certain distance from the rear edge 91 of the seat pad 12.

In some embodiments, the seat pad 12 includes a body 20, a left ear 21 that extend outwardly from a left side 33 of the body 20, and a right ear 22 that extends outwardly from a right side 34 of the body 20 as shown in FIG. 3. The body 20 of the seat pad 12 is formed to include the low-elevation tailbone support 44, the aft tailbone-locator incline 42, and the forward tailbone-locator incline 52. The left and right ears 21, 22 are thinner than the body 20 of the seat pad 12. The reduced thickness of the left and right ears 21, 22 allows stitches of thread 86 to extend through left and right ears 21, 22 and through the left and right lap belt-positioning tethers 14, 15 to secure the left and right lap belt-positioning tethers 14, 15 to the left and right ears 21, 22.

In illustrative embodiments, the seat pad 12 is constructed from compliant foam materials so that the seat pad 12 yields elastically when a child sits on the seat pad 12 as shown in FIGS. 2, 8, and 9. The seat pad 12 illustratively includes a plurality of shaped foam layers 81, 82, 83, 84 received in a foam cover 85 that cooperate to provide the body 20 of the seat pad 12. The cover 85 illustratively extends away from the body 20 of the seat pad 12 without receiving any shaped foam layers 81, 82, 83, 84 to provide the left and right ears 21, 22 that are secured to the left and right lap belt-positioning tethers 14, 15 by stitches of thread 86.

Another illustrative belt-positioning booster seat 210 in accordance with the present disclosure is adapted to be arranged on seat bottom 114 of passenger seat 112 along a seat back 115 of passenger seat 112 in vehicle 110 to support a child in the vehicle 110 as shown in FIGS. 13-16. Belt-positioning booster seat 210 includes a compliant contoured seat pad 212, a left lap belt-positioning tether 214, and a right lap belt-positioning tether 215. Compliant contoured seat pad 212 is adapted to elevate the child above seat bottom 114 of passenger seat 112. Belt-positioning tethers 214, 215 are adapted to receive and guide lap belt 120 along a preselected path so that lap belt 120 extends across the thighs of a child seated on compliant contoured seat pad 212.

Compliant contoured seat pad 212 is adapted to underlie a child supported on belt-positioning booster seat 210 and is shaped to provide means for positioning the child on passenger seat 112. Compliant contoured seat pad 212 illustratively includes a low-elevation buttocks-support portion 224 and a high-elevation leg-support portion 226 as shown in FIG. 14. Low-elevation buttocks-support portion 224 forms a back 231 of compliant contoured seat pad 212 and is adapted to underlie the buttocks of a child seated on compliant contoured seat pad 212. High-elevation leg-support portion 226 forms a front 232 of compliant contoured seat pad 212 and is adapted to support the legs of a child seated on compliant contoured seat pad 212 at an elevation generally greater than that of the low-elevation buttocks-support portion 224.

Low-elevation buttocks-support portion 224 included in compliant contoured seat pad 212 illustratively extends about half way from back 231 of compliant contoured seat pad 212 toward front 232 of compliant contoured seat pad 212 as shown in FIGS. 13 and 14. Low-elevation buttocks-support portion 224 is adapted to underlie the tailbone of a child seated on belt-positioning booster seat 210 at a preselected location relative to the passenger seat 112 that encourages the child to sit up straight on belt-positioning booster seat 210.

High-elevation leg-support portion 226 included in compliant contoured seat pad 212 illustratively extends about half way from front 232 of compliant contoured seat pad 212 toward back 231 of compliant contoured seat pad 212 as shown in FIGS. 13 and 14. High-elevation leg-support portion 226 includes a forward laterally extending peak 250 and a forward tailbone-locator incline 252 that extends rearwardly from forward laterally extending peak 250. Forward laterally extending peak 250 extends between left side 233 and right side 234 of compliant contoured seat pad 212 along front 232 of compliant contoured seat pad 212. Forward tailbone-locator incline 252 extends downwardly from forward laterally extending peak 250 to low-elevation buttocks-support portion 224.

Forward laterally extending peak 250 has a curved convex top surface and forms the top elevation of the compliant contoured seat pad 212. Forward laterally extending peak 250 cooperates with forward tailbone-locator incline 252 to provide means for angling the thighs of a child upward from low-elevation buttocks-support portion 224 causing the thighs of the child to form a slightly obtuse angle with lower legs of the child when the child is seated on the belt-positioning booster seat 210 so that the lower legs of the child are guided along a smooth transition toward a front of seat bottom 114 included in passenger seat 112 underlying belt-positioning booster seat 210.

Forward tailbone-locator incline 252 slopes downwardly from forward laterally extending peak 250 to low-elevation buttocks-support portion 224 as shown in FIGS. 13 and 14. Forward tailbone-locator incline 252 provides positioning means for locating the tailbone of a child rearward of high-elevation leg-support portion 226 over low-elevation buttocks-support portion 224 so that the tailbone of the child is located in a preselected position on an underlying passenger seat 112 and the child is encouraged to sit up straight on passenger seat 112.

High-elevation leg-support portion 226 in the illustrative embodiment further includes a sloped toe 256 that extends from forward laterally extending peak 250 to front 232 of compliant contoured seat pad 212 as shown in FIGS. 13 and 14. Sloped toe 256 slopes downwardly from forward laterally extending peak 250 and is shaped to form an obtuse angle with seat bottom 114 when compliant contoured seat pad 212 is arranged on seat bottom 114.

Left lap belt-positioning tether 214 and right lap belt-positioning tether 215 are coupled to and extend outward from compliant contoured seat pad 212 along corresponding left and right sides 233, 234 of compliant contoured seat pad 212 as shown in FIGS. 13 and 14. Each of left lap belt-positioning tether 214 and right lap belt-positioning tether 215 include a lap belt guide 254, 255 and a lap belt strap 264, 265 as shown in FIG. 15. Lap belt guides 54, 55 are configured to receive and retain lap belt 120. Each lap belt strap 264, 265 extends away from compliant contoured seat pad 212.

Lap belt guides 254, 255 are substantially similar to one another as shown in FIG. 15. The following description of lap belt guide 254 shown in FIG. 15 is equally applicable to lap belt guide 255. Lap belt guide 254 is a monolithic component formed to include apertures 266, 267 sized to receive lap belt 120 and a belt-receiver slot 270. Apertures 266, 267 illustratively provide for mating with corresponding lap belt straps 264, 265 and provide adjustment means for allowing a caregiver to vary an effective length of lap belt straps 264, 65 between the compliant contoured seat pad 212 and the corresponding lap belt guides 254, 255. Belt-receiver slot 270 is accessible through a diagonal belt-travel slot 272 communicating with the belt-receiver slot 270 to allow a child to slide lap belt 120 into the belt-receiver slot 270.

Compliant contoured seat pad 212 is a low-profile component that blends in with seat bottom 114 of passenger seat 112. Compliant contoured seat pad 212 is made of a solid foam material core 280 and is covered with a sturdy fabric material cover 285 in an illustrative embodiment of the present disclosure. This solid foam design is shaped with contours to fit a child that is not quite tall enough to fit properly in a passenger-restraint harness system 170 while seated on a passenger seat 112. This contour (as shown, for example, in FIGS. 13 and 14) prevents slouching which might otherwise contribute to raising the lap belt from the thigh region to the abdominal region of a seated child.

Adjustable lap belt guides 254, 255 included in tethers 214, 215 cooperate to help place lap belt 120 in a proper position on the thigh region of a child seated on compliant contoured seat pad 212. The lap belt guides 254, 255 are permanently held to the compliant contoured seat pad 212 with webbing such as guide-support straps 264, 265. Belt-positioning booster seat 210 avoids reliance on armrests or inflation of inflatable features to position the lap belt on a seated child.

The invention claimed is:

1. A belt-positioning booster seat for use with a passenger seat having a seat bottom and a seat back arranged to extend upwardly from the seat bottom, the belt-positioning booster seat comprising
a portable contoured seat pad including a low-elevation buttocks-support portion adapted to be positioned adjacent to the seat back of a passenger seat and a high-elevation leg-support portion adapted to be spaced apart from the seat back of the passenger seat by the rear low-elevation buttocks-support portion,
a left lap belt-positioning tether coupled to the portable contoured seat pad and arranged to extend from a left side of the portable contoured seat pad, the left lap belt-positioning tether configured to receive a vehicle lap belt, and
a right lap belt-positioning tether coupled to the portable contoured seat pad and arranged to extend from a right side of the portable contoured seat pad, the right lap belt-positioning tether configured to receive a vehicle lap belt,
wherein the high-elevation leg-support portion of the portable contoured seat pad is arranged to extend about half the length of the portable contoured seat pad from a front of the portable contoured seat pad toward a back of the portable contoured seat pad, the front high-elevation leg-support portion includes a laterally extending peak and a forward tailbone-locator incline, the laterally extending peak has a greater height than the low-elevation buttocks-support portion, the laterally extending peak has a curved convex top surface, and the forward tailbone-locator incline arranged to slope downwardly from the laterally extending peak to the low-elevation buttocks-support portion to provide positioning means for locating a tailbone of a child rearward of the high-elevation leg-support portion over the low-elevation buttocks-support portion and for angling thighs of the child upward from the low-elevation buttocks-support portion causing the thighs of the child to form a slightly obtuse angle with lower legs of the child when the child is seated on the booster seat so that the child is encouraged to sit up straight along the seat back of the passenger seat and so that the lower legs of the child are guided along a smooth transition toward a front of the seat bottom included in the passenger seat underlying the booster seat.

2. The booster seat of claim 1, wherein the rear low-elevation buttocks-support portion is arranged to extend about half the length of the portable contoured seat pad from the back of the portable contoured seat pad toward the front of the portable contoured seat pad, the rear low-elevation buttocks-support portion includes an aft laterally extending peak, a tailbone support, and an aft tailbone-locator incline is arranged to slope downwardly from the aft laterally extending peak to the tailbone support to provide positioning means for locating a tailbone of a child forward of the back of the portable contoured seat pad over the tailbone support of the rear low-elevation buttocks-support portion when the child is seated on the booster seat so that the child is encouraged to sit up straight along the seat back of the passenger seat.

3. The booster seat of claim 2, wherein the curved convex top surface of the laterally extending peak forms a top elevation of the portable contoured seat pad and has a curve radius of about 37.5 millimeters at the top elevation of the portable contoured seat pad.

4. The booster seat of claim 2, wherein the forward tailbone-locator incline of the high-elevation leg-support portion extends upwardly from the tailbone support of the low-elevation buttocks-support portion to the laterally extending peak at a first angle defined between a generally flat plane tangent to the tailbone support of the low-elevation buttocks-support portion and the top of the forward tailbone-locator incline.

5. The booster seat of claim 4, wherein the aft tailbone-locator incline of the low-elevation buttocks-support portion extends upwardly from the tailbone support of the low-elevation buttocks-support portion at a second angle, smaller than the first angle, defined between the generally flat plane tangent to the tailbone support of the low-elevation buttocks-support portion and the top of the aft tailbone-locator incline.

6. The booster seat of claim 5, wherein the first angle is about 9 degrees and the second angle is about 5.5 degrees.

7. The booster seat of claim 4, wherein the portable contoured seat pad is formed from a plurality of shaped foam layers received in a cover and the shaped foam layers are sized to define the laterally extending peak, the forward tailbone-locator incline, the tailbone support, and the aft tailbone-locator incline of the portable contoured seat pad.

8. The booster seat of claim 1, wherein the portable contoured seat pad includes a left ear that extends from a left side of the low-elevation buttocks-support portion and a right ear that extends from a right side of the low-elevation buttocks-support portion, the left lap belt-positioning tether is secured to the left ear, and the right lap belt-positioning tether is secured to the right ear.

9. The booster seat of claim 8, wherein the left ear and the right ear are thinner than the low-elevation buttocks-support portion so that stitches of thread used to secure the left lap belt-positioning tether to the left ear can pass through the left ear and the left lap belt-positioning tether and stitches of thread used to secure the right lap belt-positioning tether to the right ear can pass through the right ear and the right lap belt-positioning tether.

10. The booster seat of claim 9, wherein the low-elevation buttocks-support portion and the high-elevation leg-support portion included in the portable contoured seat pad are formed from a plurality of shaped foam layers received in a cover and the left ear and the right ear are formed from portions of the cover that do not receive a shaped foam layer.

11. The booster seat of claim 9, wherein the left lap belt-positioning tether includes a left lap belt guide adapted to receive a lap belt and a first portion of a lap belt strap, the right lap belt-positioning tether includes a right lap belt guide adapted to receive a lap belt and a second portion of the lap belt strap, and the lap belt strap extends along an underside of the portable contoured seat pad from the left side to the right side of the portable contoured seat pad to provide a handle that can be grasped by a caregiver moving the booster seat.

12. A booster seat comprising
a portable contoured seat pad including a rear low-elevation buttocks-support portion adapted to underlie buttocks of a child seated on the booster seat and a front high-elevation leg-support portion adapted to underlie thighs of a child seated on the booster seat,
a left lap belt-positioning tether coupled to the portable contoured seat pad and arranged to extend from a left side of the portable contoured seat pad and configured to retain a vehicle lap belt in a selected position relative to the portable contoured seat pad, and right lap belt-positioning tether coupled to the portable contoured seat pad and arranged to extend from a right side of the portable contoured seat pad and configured to retain a vehicle lap belt in a selected position relative to the portable contoured seat pad, wherein the rear low-elevation buttocks-support portion is arranged to extend about half the length of the portable contoured seat pad from a back of the portable contoured seat pad toward a front of the portable contoured seat pad, the rear low-elevation buttocks-support portion includes a aft tailbone-locator incline and a tailbone support, and the aft tailbone-locator incline is arranged to extend upwardly from the tailbone support toward the back of the portable contoured seat pad forming a first angle defined between a generally flat plane tangent to the tailbone support of the low-elevation buttocks-support portion and a top of the aft tailbone-locator incline to locate a tailbone of a child forward of the aft tailbone-locator incline over the tailbone support of the rear low-elevation buttocks-support portion when the child is seated on the portable contoured seat pad, and the high-elevation leg-support portion is arranged to extend about half the length of the portable contoured seat pad from the front of the portable contoured seat pad toward the back of the portable contoured seat pad, the high-elevation leg-support portion includes a laterally extending peak and a forward tailbone-locator incline, the laterally extending peak has a curved convex top surface that extends along the front of the portable contoured seat pad, and the forward tailbone-locator incline is arranged to extend downwardly from the laterally extending peak to the tailbone support of the rear low-elevation buttocks-support portion forming a second angle defined between a generally flat plane tangent to the tailbone support of the low-elevation buttocks-support portion and a top of the forward tailbone-locator incline, the second angle greater than the first angle, to locate the tailbone of the child rearward of the forward inclined section over the tailbone support of the rear low-elevation buttocks-support portion when the child is seated on the portable contoured seat pad.

13. The booster seat of claim 12, wherein the curved convex top surface of the laterally extending peak forms a top elevation of the portable contoured seat pad and has a radius of about 37.5 millimeters to cause the thighs of the child form a slightly obtuse angle with lower legs of the child when the child is seated on the booster seat.

14. The booster seat of claim 12, wherein the width of the rear low-elevation buttocks-support portion is smaller than the width of the high-elevation leg-support portion so that thighs of a child seated on the booster seat can be splayed apart to the width of the high-elevation leg-support portion and remain supported on the high-elevation leg-support portion.

15. The booster seat of claim 14, wherein the portable contoured seat pad is formed from a plurality of shaped foam layers received in a cover and the shaped foam layers are sized to define the laterally extending peak, the forward tailbone-locator incline, the tailbone support, and the aft tailbone-locator incline of the portable contoured seat pad.

16. The booster seat of claim 15, wherein the portable contoured seat pad includes a left ear that extends from a left side of the low-elevation buttocks-support portion that is thinner than the low-elevation buttocks-support portion and a right ear thinner than the low-elevation buttocks-support portion that extends from a right side of the low-elevation buttocks-support portion, the left lap belt-positioning tether is secured to the left ear, and the right lap belt-positioning tether is secured to the right ear.

17. The booster seat of claim 16, wherein the left ear and the right ear are formed from portions of the cover that do not receive a shaped foam layer, stitches of thread extend through the left ear and the left lap belt-positioning tether to secure the left lap belt-positioning tether to the left ear, and stitches of thread extend through the right ear and the right lap belt-positioning tether to secure the right lap belt-positioning tether to the right ear.

18. A booster seat comprising
a portable contoured seat pad including a body constructed from a plurality of shaped layers made from a foam material received in a cover and the shaped foam layers are sized to define a contoured top side of the portable contoured seat pad forming a low-elevation buttocks-support portion adapted to be positioned adjacent to the seat back of a passenger seat and a high-elevation leg-support portion adapted to be spaced apart from the seat back of the passenger seat by the rear low-elevation buttocks-support portion, wherein there is greater number of layers of foam material in the high-elevation leg-support portion than in the low-elevation buttocks-support portion, a left lap belt-positioning tether coupled to the portable contoured seat pad and arranged to extend outwardly from a left side of the portable contoured seat pad, the left lap belt-positioning tether configured to receive a lap belt, and a right lap belt-positioning tether coupled to the portable contoured seat pad and arranged to extend outwardly from a right side of the portable contoured seat pad, the right lap belt-positioning tether configured to receive a lap belt.

19. The booster seat of claim 18, wherein the portable contoured seat pad includes a left ear that extends from a left side of the body that is thinner than the body and a right ear thinner than the body that extends from a right side of the body, the left lap belt-positioning tether is secured to the left ear, and the right lap belt-positioning tether is secured to the right ear.

20. The booster seat of claim 19, wherein the left ear and the right ear are formed from portions of the cover that do not receive a shaped foam layer, stitches of thread extend through the left ear and the left lap belt-positioning tether to secure the left lap belt-positioning tether to the left ear, and stitches of thread extend through the right ear and the right lap belt-positioning tether to secure the right lap belt-positioning tether to the right ear.

21. The booster seat of claim 20, wherein the left lap belt-positioning tether includes a left lap belt guide adapted to receive a lap belt and a left lap belt strap that is secured to the left ear by stitches of thread and the right lap belt-positioning tether includes a right lap belt guide adapted to receive a lap belt and a right lap belt strap secured to the right ear by stitches of thread.

22. The booster seat of claim 18, wherein the cover is made from a foam material so that the entire portable contoured seat pad is constructed from foam materials without hardened components.

23. The booster seat of claim 22, wherein the cover is formed to define a plurality of slip reducer feet that extend downwardly from an underside the body included in the portable contoured seat pad.

24. The booster seat of claim 18, wherein each of the left lap belt-positioning tether and the right lap belt-positioning tether includes a lap belt guide configured to receive and retain the lap belt and a lap belt strap that extends outwardly from the portable contoured seat pad and the lap belt guides of the left lap belt-positioning tether and of the right lap belt-positioning tether coupled to a corresponding lap belt strap to move along the corresponding lap belt strap toward and away from the portable contoured seat pad.

\* \* \* \* \*